(12) United States Patent
Anderson et al.

(10) Patent No.: US 11,755,322 B2
(45) Date of Patent: *Sep. 12, 2023

(54) VECTOR LOAD AND DUPLICATE OPERATIONS

(71) Applicant: TEXAS INSTRUMENTS INCORPORATED, Dallas, TX (US)

(72) Inventors: Timothy David Anderson, University Park, TX (US); Duc Quang Bui, Grand Prairie, TX (US); Peter Richard Dent, Northamptonshire (GB)

(73) Assignee: Texas Instruments Incorporated, Dallas, TX (US)

( * ) Notice: Subject to any disclaimer, the term of this patent is extended or adjusted under 35 U.S.C. 154(b) by 77 days.

This patent is subject to a terminal disclaimer.

(21) Appl. No.: 16/580,490

(22) Filed: Sep. 24, 2019

(65) Prior Publication Data

US 2020/0089495 A1    Mar. 19, 2020

Related U.S. Application Data

(63) Continuation of application No. 14/326,943, filed on Jul. 9, 2014, now Pat. No. 10,423,413.

(60) Provisional application No. 61/844,135, filed on Jul. 9, 2013.

(51) Int. Cl.
    *G06F 9/30*      (2018.01)

(52) U.S. Cl.
    CPC ...... *G06F 9/30036* (2013.01); *G06F 9/30032* (2013.01); *G06F 9/30043* (2013.01)

(58) Field of Classification Search
    CPC .................. G06F 9/30036; G06F 9/30043
    See application file for complete search history.

(56) References Cited

U.S. PATENT DOCUMENTS

| | | |
|---|---|---|
| 2003/0120903 A1 | 6/2003 | Roussel |
| 2008/0282034 A1 | 11/2008 | Jiao et al. |
| 2009/0172349 A1 | 7/2009 | Sprangle et al. |
| 2009/0307656 A1 | 12/2009 | Eichenberger et al. |
| 2011/0040821 A1 | 2/2011 | Eichenberger et al. |
| 2013/0339664 A1* | 12/2013 | Ould-Ahmed-Vall ............ G06F 9/30109 712/205 |
| 2014/0019712 A1 | 1/2014 | Ould-Ahmed-Vall et al. |

* cited by examiner

*Primary Examiner* — Jacob Petranek
(74) *Attorney, Agent, or Firm* — Carl G. Peterson; Frank D. Cimino

(57) ABSTRACT

Disclosed embodiments relate to methods of using a processor to load and duplicate scalar data from a source into a destination register. The data may be duplicated in byte, half word, word or double word parts, according to a duplication pattern.

18 Claims, 9 Drawing Sheets

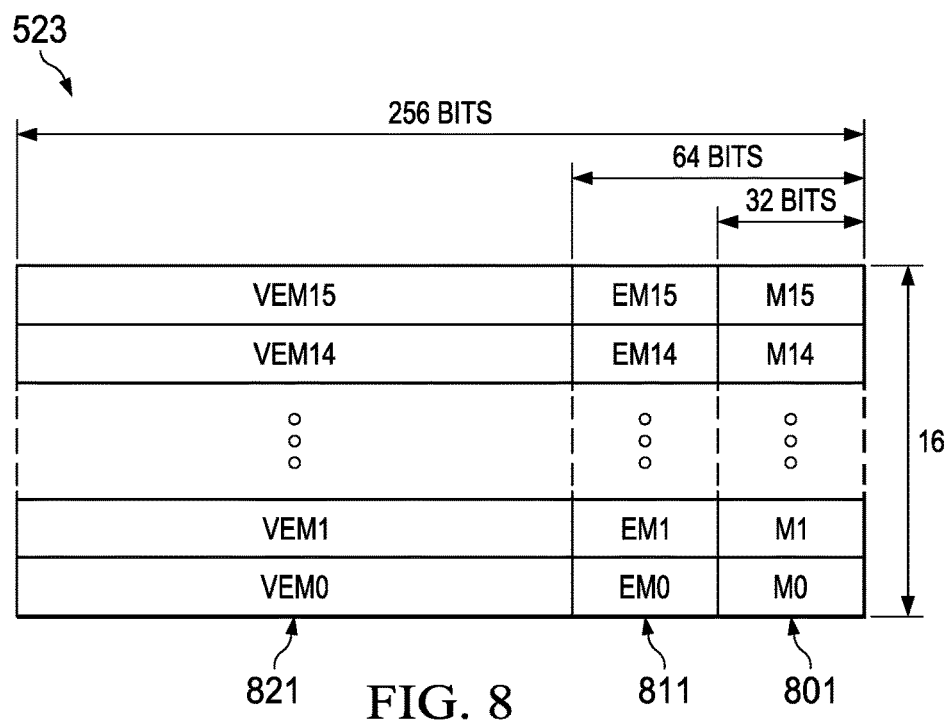
FIG. 8
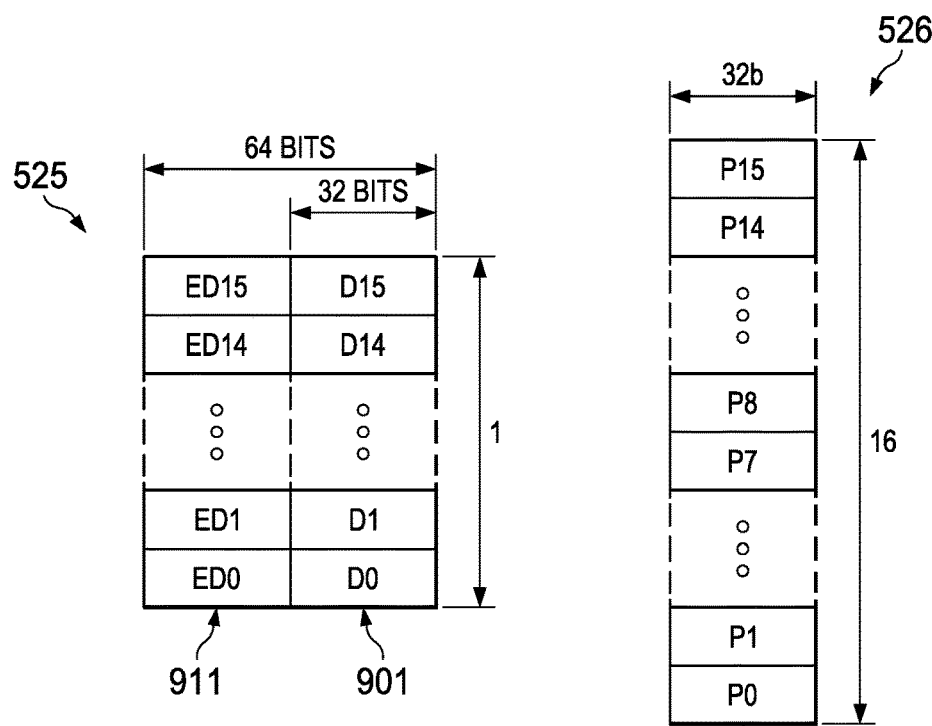
FIG. 9
FIG. 10

| ELEMENTS | VLDDUP TYPE | VLDDUP MNEMONICS | PATTERNS (LITTLE ENDIAN) | PATTERNS (BIG ENDIAN) |
|---|---|---|---|---|
| | | | ...fedcba9876543210 | ...fedcba9876543210 |
| 2 | B | VLDDUP2B | ffeeddccbbaa99887766554433221100 | ffeeddccbbaa99887766554433221100 |
| 2 | H | VLDDUP2H | fefedcdcbaba98987676545432323210 | efefcdcdabab89896767454523230101 |
| 2 | W | VLDDUP2W | fedcfedcba98ba9876547654321003210 | cdefcdef89ab89ab45674567010230123 |
| 2 | D | VLDDUP2D | fedcba98fedcba9876543210776543210 | 89abcdef89abcdef0123456701234567 |
| 4 | B | VLDDUP4B | 77776666555544443333222211110000 | 77776666555544443333222211110000 |
| 4 | H | VLDDUP4H | 76767676545454543232323210101010 | 67676767454545452323232301010101 |
| 4 | W | VLDDUP4W | 76547654765432103210321003210 | 45674567456701230123 |
| 4 | D | VLDDUP4D | 76543210765432107676543210 | 01234567012345670123456701234567 |
| 8 | B | VLDDUP8B | 33333333222222221111111100000000 | 33333333222222221111111100000000 |
| 8 | H | VLDDUP8H | 32323232323232321010101010101010 | 23232323232323230101010101010101 |
| 8 | W | VLDDUP8W | 32103210321003210321003210 | 01230123012301230123 |

FIG. 17

VECTOR LOAD AND DUPLICATE OPERATIONS

CROSS-REFERENCE TO RELATED APPLICATIONS

This application is a continuation of U.S. patent application Ser. No. 14/326,943 filed on Jul. 9, 2014, which claims priority to U.S. Provisional Application No. 61/844,135 filed on Jul. 9, 2013.

TECHNICAL FIELD

The technical field of this invention is digital data processing and, more specifically, to a load and duplicate operation.

BACKGROUND

Processors, such as digital signal processors may implement many algorithms that perform operations on wide Single Instruction Multiple Data (SIMD) vector data against scalar data or against a specific duplication pattern of the scalar data. This normally takes multiple instructions, for instance, first the loading of the scalar data and then the duplication.

SUMMARY

The load and duplicate operation described in this invention combines the loading of the scalar data and the duplication operation into a single operation, freeing up one execution slot. Duplication patterns are specified as the amount of duplication of each element and the length of the element as byte, half word, word or double word.

BRIEF DESCRIPTION OF THE DRAWINGS

These and other aspects of this invention are illustrated in the drawings, in which:

FIG. 8 illustrates a local vector register file shared by multiply and correlation functional units;

FIG. 9 illustrates a local register file of a load/store unit;

FIG. 10 illustrates a predicate register file;

FIG. 17 illustrates one embodiment of the invention.

DETAILED DESCRIPTION

Figure 1:
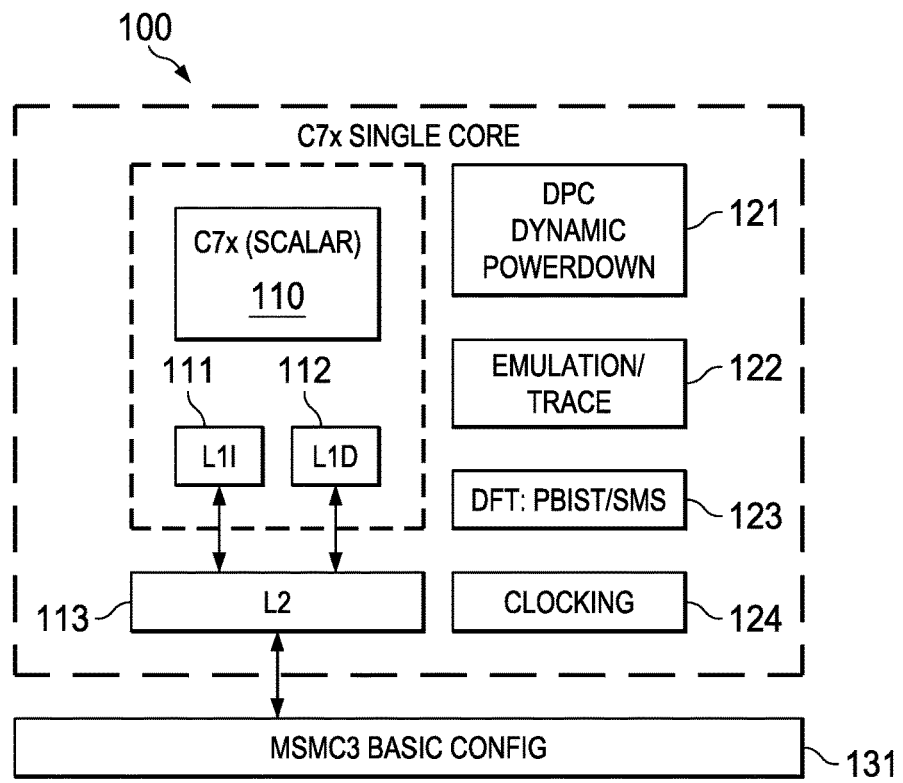
FIG. 1 illustrates a single core scalar processor according to one embodiment of this invention.

FIG. 1 illustrates a single core scalar processor according to one embodiment of this invention. Single core processor 100 includes a scalar central processing unit (CPU) 110 coupled to separate level one instruction cache (L1I) 111 and level one data cache (L1D) 112. Central processing unit core 110 could be constructed as known in the art and would typically include a register file, an integer arithmetic logic unit, an integer multiplier and program flow control units. Single core processor 100 includes a level two combined instruction/data cache (L2) 113 that holds both instructions and data. In the preferred embodiment scalar central processing unit (CPU) 110, level one instruction cache (L1I) 111, level one data cache (L1D) 112 and level two combined instruction/data cache (L2) 113 are formed on a single integrated circuit.

In a preferred embodiment this single integrated circuit also includes auxiliary circuits such as power control circuit 121, emulation/trace circuits 122, design for test (DST) programmable built-in self test (PBIST) circuit 123 and clocking circuit 124. External to CPU 110 and possibly integrated on single integrated circuit 100 is memory controller 131.

CPU 110 operates under program control to perform data processing operations upon defined data. The program controlling CPU 110 consists of a plurality of instructions that must be fetched before decoding and execution. Single core processor 100 includes a number of cache memories. FIG. 1 illustrates a pair of first level caches. Level one instruction cache (L1I) 111 stores instructions used by CPU 110. CPU 110 first attempts to access any instruction from level one instruction cache 121. Level one data cache (L1D) 112 stores data used by CPU 110. CPU 110 first attempts to access any required data from level one data cache 112. The two level one caches (L1I 111 and L1D 112) are backed by a level two unified cache (L2) 113. In the event of a cache miss to level one instruction cache 111 or to level one data cache 112, the requested instruction or data is sought from level two unified cache 113. If the requested instruction or data is stored in level two unified cache 113, then it is supplied to the requesting level one cache for supply to central processing unit core 110. As is known in the art, the requested instruction or data may be simultaneously supplied to both the requesting cache and CPU 110 to speed use.

Level two unified cache 113 is further coupled to higher level memory systems via memory controller 131. Memory controller 131 handles cache misses in level two unified cache 113 by accessing external memory (not shown in FIG. 1). Memory controller 131 handles all memory centric functions such as cacheability determination, error detection and correction, address translation and the like. Single core processor 100 may be a part of a multiprocessor system. In that case memory controller 131 handles data transfer between processors and maintains cache coherence among processors.

Figure 2:
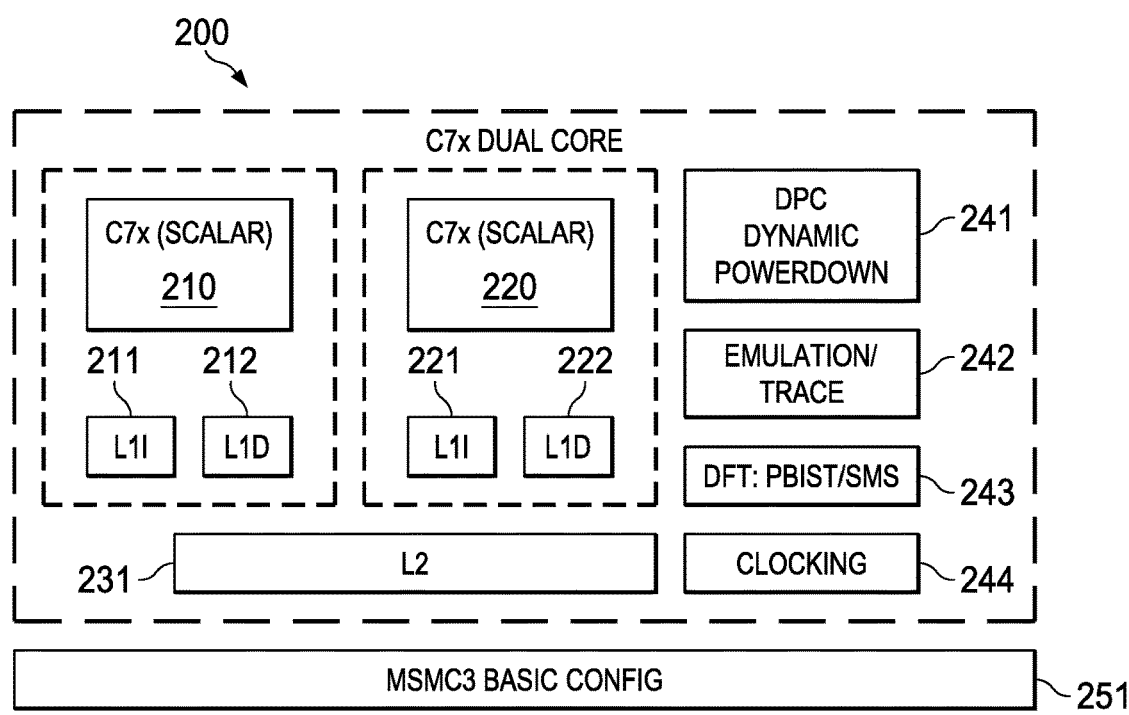
FIG. 2 illustrates a dual core scalar processor according to another embodiment of this invention.

FIG. 2 illustrates a dual core processor according to another embodiment of this invention. Dual core processor 200 includes first CPU 210 coupled to separate level one instruction cache (L1I) 211 and level one data cache (L1D) 212 and second CPU 220 coupled to separate level one instruction cache (L1I) 221 and level one data cache (L1D) 212. Central processing units 210 and 220 are preferably constructed similar to CPU 110 illustrated in FIG. 1. Dual core processor 200 includes a single shared level two combined instruction/data cache (L2) 231 supporting all four level one caches (L1I 211, L1D 212, L1I 221 and L1D 222). In the preferred embodiment CPU 210, level one instruction cache (L1I) 211, level one data cache (L1D) 212, CPU 220, level one instruction cache (L1I) 221, level one data cache (L1D) 222 and level two combined instruction/data cache (L2) 231 are formed on a single integrated circuit. This single integrated circuit preferably also includes auxiliary circuits such as power control circuit 241, emulation/trace circuits 242, design for test (DST) programmable built-in-self-test (PBIST) circuit 243, and clocking circuit 244. This single integrated circuit may also include memory controller 251.

Figure 3:
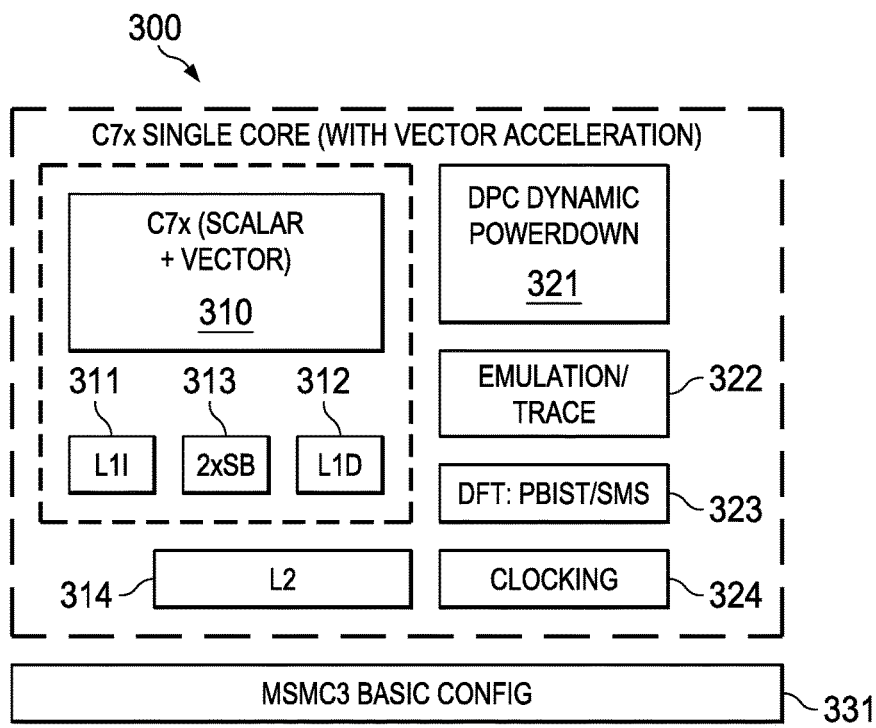
FIG. 3 illustrates a single core vector processor according to a further embodiment of this invention.
Figure 4:
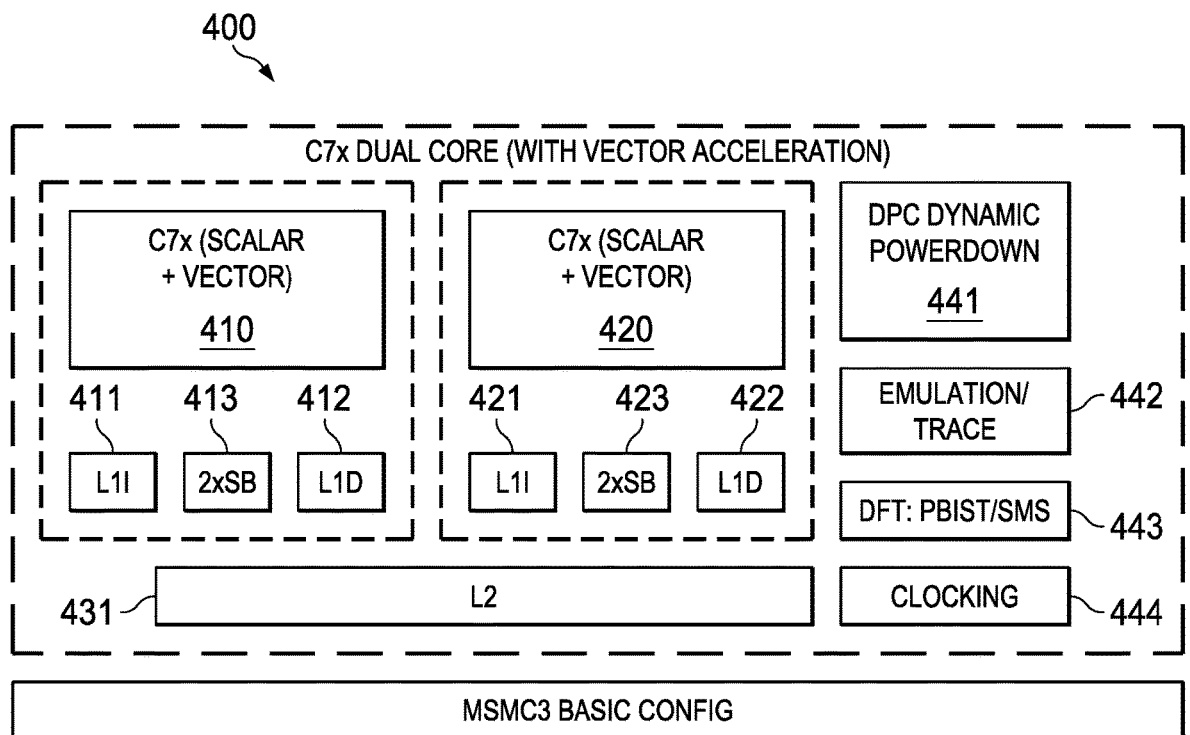
FIG. 4 illustrates a dual core vector processor according to a further embodiment of this invention.

FIGS. 3 and 4 illustrate single core and dual core processors similar to that shown respectively in FIGS. 1 and 2. FIGS. 3 and 4 differ from FIGS. 1 and 2 in showing vector central processing units. As further described below Single core vector processor 300 includes a vector CPU 310. Dual core vector processor 400 includes two vector CPUs 410 and 420. Vector CPUs 310, 410 and 420 include wider data path operational units and wider data registers than the corresponding scalar CPUs 110, 210 and 220.

Figure 5:
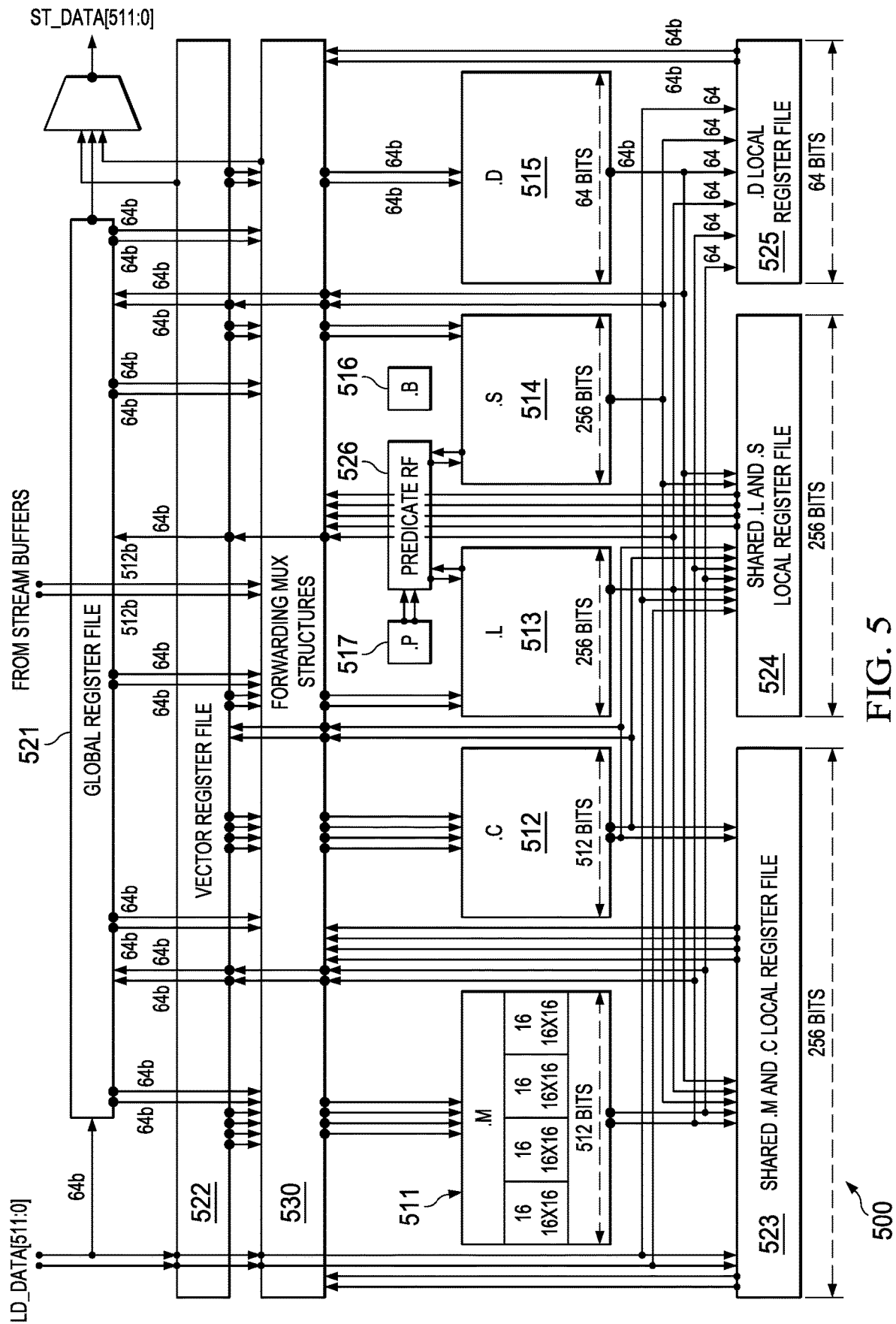
FIG. 5 illustrates construction of one embodiment of a central processing unit of this invention.

Vector CPUs 310, 410 and 420 further differ from the corresponding scalar CPUs 110, 210 and 220 in the inclusion of streaming engine 313 (FIG. 3) and streaming engines 413 and 423 (FIG. 5). Streaming engines 313, 413 and 423 are similar. Streaming engine 313 transfers data from level two unified cache 313 (L2) to a vector CPU 310. Streaming engine 413 transfers data from level two unified cache 431 to vector CPU 410. Streaming engine 423 transfers data from level two unified cache 431 to vector CPU 420. In accordance with the preferred embodiment each streaming engine 313, 413 and 423 manages up to two data streams.

Each streaming engine 313, 413 and 423 transfers data in certain restricted circumstances. A stream consists of a sequence of elements of a particular type. Programs that operate on streams read the data sequentially, operating on each element in turn. Every stream has the following basic properties. The stream data have a well-defined beginning and ending in time. The stream data have fixed element size and type throughout the stream. The stream data have fixed sequence of elements. Thus programs cannot seek randomly within the stream. The stream data is read-only while active. Programs cannot write to a stream while simultaneously reading from it. Once a stream is opened the streaming engine: calculates the address; fetches the defined data type from level two unified cache; performs data type manipulation such as zero extension, sign extension, data element sorting/swapping such as matrix transposition; and delivers the data directly to the programmed execution unit within the CPU. Streaming engines are thus useful for real-time digital filtering operations on well-behaved data. Streaming engines free these memory fetch tasks from the corresponding CPU enabling other processing functions.

The streaming engines provide the following benefits. They permit multi-dimensional memory accesses. They increase the available bandwidth to the functional units. They minimize the number of cache miss stalls since the stream buffer can bypass L1D cache. They reduce the number of scalar operations required in the loop to maintain. They manage the address pointers. They handle address generation automatically freeing up the address generation instruction slots and the .D unit for other computations.

FIG. 5 illustrates construction of one embodiment of the CPU of this invention. Except where noted this description covers both scalar CPUs and vector CPUs. The CPU of this invention includes plural execution units multiply unit 511 (.M), correlation unit 512 (.C), arithmetic unit 513 (.L), arithmetic unit 514 (.S), load/store unit 515 (.D), branch unit 516 (.B) and predication unit 517 (.P). The operation and relationships of these execution units are detailed below.

Multiply unit 511 primarily performs multiplications. Multiply unit 511 accepts up to two double vector operands and produces up to one double vector result. Multiply unit 511 is instruction configurable to perform the following operations: various integer multiply operations, with precision ranging from 8-bits to 64-bits; various regular and complex dot product operations; and various floating point multiply operations; bit-wise logical operations; moves; as well as adds and subtracts. As illustrated in FIG. 5 multiply unit 511 includes hardware for four simultaneous 16 bit by 16 bit multiplications. Multiply unit 511 may access global scalar register file 521, global vector register file 522 and shared .M and C. local register 523 file in a manner described below. Forwarding multiplexer 530 mediates the data transfer between global scalar register file 521, global vector register file 522, the corresponding streaming engine and multiply unit 511.

Correlation unit 512 (.C) accepts up to two double vector operands and produces up to one double vector result. Correlation unit 512 supports these major operations. In support of WCDMA "Rake" and "Search" instructions correlation unit 512 performs up to 512 2-bit PN*8-bit I/Q complex multiplies per clock cycle. Correlation unit 512 performs 8-bit and 16-bit Sum-of-Absolute-Difference (SAD) calculations performing up to 512 SADs per clock cycle. Correlation unit 512 performs horizontal add and horizontal min/max instructions. Correlation unit 512 performs vector permutes instructions. Correlation unit 512 includes contains 8 256-bit wide control registers. These control registers are used to control the operations of certain correlation unit instructions. Correlation unit 512 may access global scalar register file 521, global vector register file 522 and shared .M and C. local register file 523 in a manner described below. Forwarding multiplexer 530 mediates the data transfer between global scalar register file 521, global vector register file 522, the corresponding streaming engine and correlation unit 512.

CPU 500 includes two arithmetic units: arithmetic unit 513 (.L) and arithmetic unit 514 (.S). Each arithmetic unit 513 and arithmetic unit 514 accepts up to two vector operands and produces one vector result. The compute units support these major operations. Arithmetic unit 513 and arithmetic unit 514 perform various single-instruction-multiple-data (SIMD) fixed point arithmetic operations with precision ranging from 8-bit to 64-bits. Arithmetic unit 513 and arithmetic unit 514 perform various compare and minimum/maximum instructions which write results directly to predicate register file 526 (further described below). Arithmetic unit 513 and arithmetic unit 514 perform various SIMD floating point arithmetic operations with precision ranging from half-precision (16-bits), single precision (32-bits) to double precision (64-bits). Arithmetic unit 513 and arithmetic unit 514 perform specialized instructions to speed up various algorithms and functions. Arithmetic unit 513 and arithmetic unit 514 may access global scalar register file 521, global vector register file 522, shared .L and S. local register file 524 and predicate register file 526 in a manner described below. Forwarding multiplexer 530 mediates the data transfer between global scalar register file 521, global vector register file 522, the corresponding streaming engine and arithmetic units 513 and 514.

Load/store unit 515 (.D) is primarily used for address calculations. Load/store unit 515 is expanded to accept scalar operands up to 64-bits and produces scalar result up to 64-bits. Load/store unit 515 includes additional hardware to perform data manipulations such as swapping, pack and unpack on the load and store data to reduce workloads on the other units. Load/store unit 515 can send out one load or store request each clock cycle along with the 44-bit physical address to level one data cache (L1D). Load or store data width can be 32-bits, 64-bits, 256-bits or 512-bits. Load/store unit 515 supports these major operations: 64-bit SIMD arithmetic operations; 64-bit bit-wise logical operations; and scalar and vector load and store data manipulations. Load/store unit 515 preferably includes a micro-TLB (table look-aside buffer) block to perform address translation from a 48-bit virtual address to a 44-bit physical address. Load/store unit 515 may access global scalar register file 521, global vector register file 522 and .D local register file 525 in a manner described below. Forwarding multiplexer 530 mediates the data transfer between global scalar register file 521, global vector register file 522, the corresponding streaming engine and load/store unit 515.

Branch unit 516 (.B) calculates branch addresses, performs branch predictions, and alters control flows dependent on the outcome of the prediction.

Predication unit 517 (.P) is a small control unit which performs basic operations on vector predication registers. Predication unit 517 has direct access to the vector predication registers 526. Predication unit 517 performs different bit operations on the predication registers such as AND, ANDN, OR, XOR, NOR, BITR, NEG, SET, BITCNT, RMBD, BIT Decimate and Expand, etc.

Figure 6:
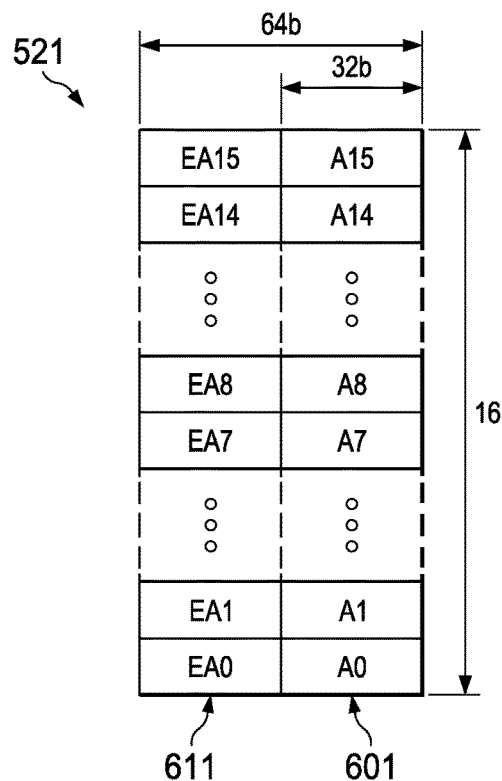
FIG. 6 illustrates a global scalar register file.

FIG. 6 illustrates global scalar register file 521. There are 16 independent 64-bit wide scalar registers. Each register of global scalar register file 521 can be read as 32-bit scalar data (designated registers A0 to A15 601) or 64-bit scalar data (designated registers EA0 to EA15 611). However, writes are always 64-bit, zero-extended to fill up to 64-bits if needed. All scalar instructions of all functional units can read or write to global scalar register file 521. The instruction type determines the data size. Global scalar register file 521 supports data types ranging in size from 8-bits through 64-bits. A vector instruction can also write to the 64-bit global scalar registers 521 with the upper 192 bit data of the vector discarded. A vector instruction can also read 64-bit data from the global scalar register file 512. In this case the operand is zero-extended in the upper 192 bits to form an input vector.

Figure 7:
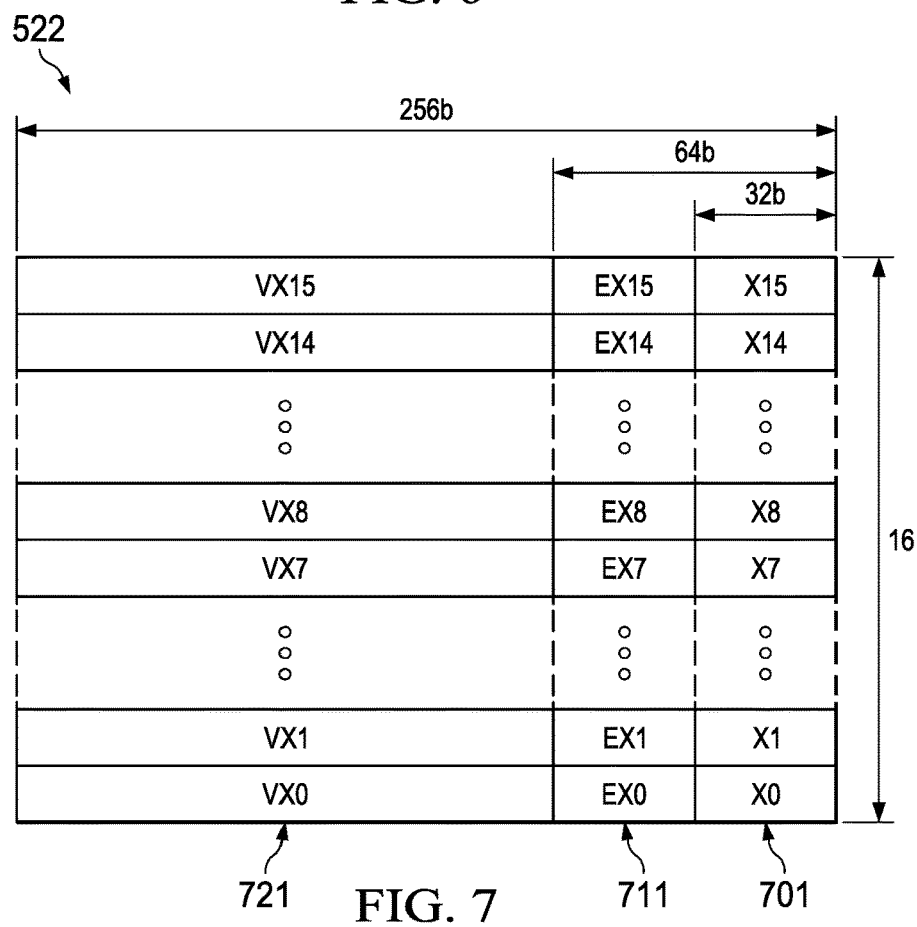
FIG. 7 illustrates a global vector register file.

FIG. 7 illustrates global vector register file 522. There are 16 independent 256-bit wide vector registers. Each register of global vector register file 522 can be read as 32-bit scalar data (designated registers X0 to X15 701), 64-bit scalar data (designated registers EX0 to EX15 711), 256-bit vector data (designated registers VX0 to VX15 721) or 512-bit double vector data (designated DVX0 to DVX7, not illustrated). In the current embodiment only multiply unit 511 and correlation unit 512 may execute double vector instructions. All vector instructions of all functional units can read or write to global vector register file 522. Any scalar instruction of any functional unit can also access the low 32 or 64 bits of a global vector register file 522 register for read or write. The instruction type determines the data size.

FIG. 8 illustrates local vector register file 523. There are 16 independent 256-bit wide vector registers. Each register of local vector register file 523 can be read as 32-bit scalar data (designated registers M0 to M15 701), 64-bit scalar data (designated registers EM0 to EM15 711), 256-bit vector data (designated registers VM0 to VM15 721) or 512-bit double vector data (designated DVM0 to DVM7, not illustrated). In the current embodiment only multiply unit 511 and correlation unit 512 may execute double vector instructions. All vector instructions of all functional units can write to local vector register file 523. Only instructions of multiply unit 511 and correlation unit 512 may read from local vector register file 523. The instruction type determines the data size.

Multiply unit 511 may operate upon double vectors (512-bit data). Multiply unit 511 may read double vector data from and write double vector data to global vector register file 522 and local vector register file 523. Register designations DVXx and DVMx are mapped to global vector register file 522 and local vector register file 523 as follows.

TABLE 1

| Instruction Designation | Register Accessed |
|---|---|
| DVX0 | VX1:VX0 |
| DVX1 | VX3:VX2 |
| DVX2 | VX5:VX4 |
| DVX3 | VX7:VX6 |
| DVX4 | VX9:VX8 |
| DVX5 | VX11:VX10 |
| DVX6 | VX13:VX12 |
| DVX7 | VX15:VX14 |
| DVM0 | VM1:VM0 |
| DVM1 | VM3:VM2 |
| DVM2 | VM5:VM4 |
| DVM3 | VM7:VM6 |
| DVM4 | VM9:VM8 |
| DVM5 | VM11:VM10 |
| DVM6 | VM13:VM12 |
| DVM7 | VM15:VM14 |

Each double vector designation maps to a corresponding pair of adjacent vector registers in either global vector register 522 or local vector register 523. Designations DVX0 to DVX7 map to global vector register 522. Designations DVM0 to DVM7 map to local vector register 523.

Local vector register file 524 is similar to local vector register file 523. Local vector register file 524 includes 16 independent 256-bit wide vector registers. Each register of local vector register file 524 can be read as 32-bit scalar data (designated registers L0 to L15, not illustrated), 64-bit of scalar data (designated registers EL0 to EL15, not illustrated), or 256-bit vector data (designated registers VL0 to VL15, not illustrated). All vector instructions of all functional units can write to local vector register file 524. Only instructions of arithmetic unit 513 and arithmetic unit 514 may read from local vector register file 524.

FIG. 9 illustrates local register file 525. There are 16 independent 64-bit wide registers. Each register of local register file 525 can be read as 32-bit scalar data (designated registers D0 to D15 901) or 64-bit scalar data (designated registers ED0 to ED15 911). All scalar and vector instructions of all functional units can write to local register file 525. Only instructions of load/store unit 515 may read from local register file 525. Any vector instructions can also write 64-bit data to local register file 525 with the upper 192 bits of data of the result vector discarded. Any vector instructions can also read 64-bit data from the 64-bit local register file 525 registers. The return data is zero-extended in the upper 192 bits to form an input vector. The registers of local register file 525 can only be used as addresses in load/store instructions, not as store data or as sources for 64-bit arithmetic and logical instructions of load/store unit 515.

FIG. 10 illustrates the predicate register file 526. There are sixteen 32-bit registers in predicate register file 526. Predicate register file 526 contains the results from vector comparison operations and is used by vector selection instructions and vector predicated store instructions. A small subset of special instructions can also read directly from predicate registers, perform operations, and write back to a predicate register directly. There are also instructions which can transfer values between the global register files (521 and 522) and predicate register file 526. Transfers between predicate register file 526 and local register files (523, 524 and 525) are not supported in this example embodiment. Each bit of a predicate register (designated P0 to P15) controls a byte of a vector data. Since a vector is 256-bits in this example, the width of a predicate register equals 256/8=32 bits. In another example, a vector can be 512-bits, and each of the 16 predicate registers in predicate register file 526 can be 64 bits (512/8). The predicate register file 526 can be written to by vector comparison operations to store the results of the vector compares.

A CPU such as CPU 110, 210, 220, 310, 410 or 420 operates on an instruction pipeline. This instruction pipeline can dispatch up to nine parallel 32-bit slots to provide instructions to the seven execution units (multiply unit 511, correlation unit 512, arithmetic unit 513, arithmetic unit 514, load/store unit 515, branch unit 516 and predication unit 517) every cycle. Instructions are fetched using instruction packets of fixed length further described below. All instructions require the same number of pipeline phases for fetch and decode, but require a varying number of execute phases.

Figure 11:
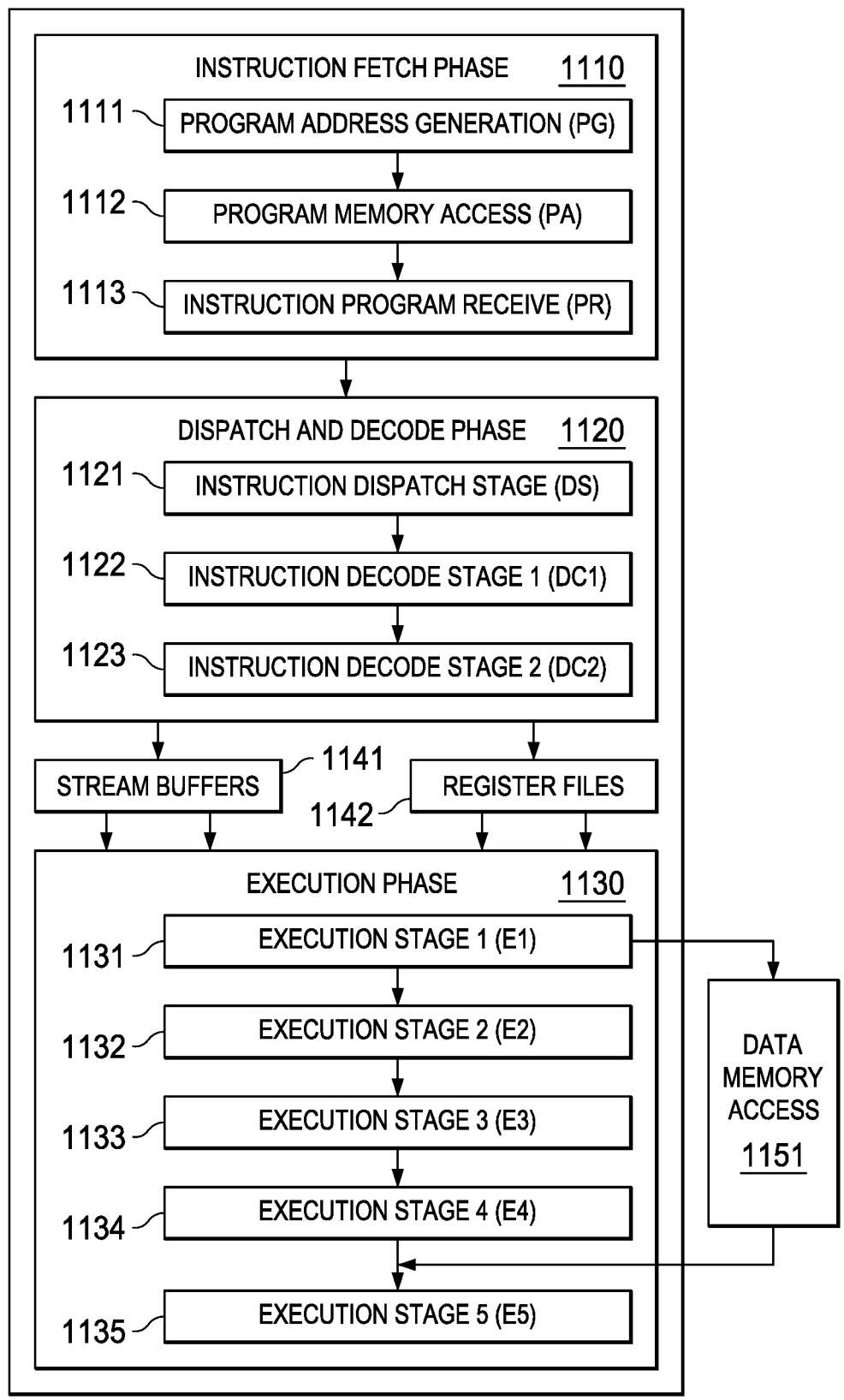
FIG. 11 illustrates pipeline phases of a central processing unit according to an embodiment of this invention.

FIG. 11 illustrates the following pipeline phases: program fetch phase 1110, dispatch and decode phases 1120 and execution phases 1130. Program fetch phase 1110 includes three stages for all instructions. Dispatch and decode phases 1120 include three stages for all instructions. Execution phase 1130 includes one to four stages dependent on the instruction.

Fetch phase 1110 includes program address generation stage 1111 (PG), program access stage 1112 (PA) and program receive stage 1113 (PR). During program address generation stage 1111 (PG), the program address is generated in the CPU and the read request is sent to the memory controller for the level one instruction cache L1I. During the program access stage 1112 (PA) the level one instruction cache L1I processes the request, accesses the data in its memory and sends a fetch packet to the CPU boundary. During the program receive stage 1113 (PR) the CPU registers the fetch packet.

Figure 12:
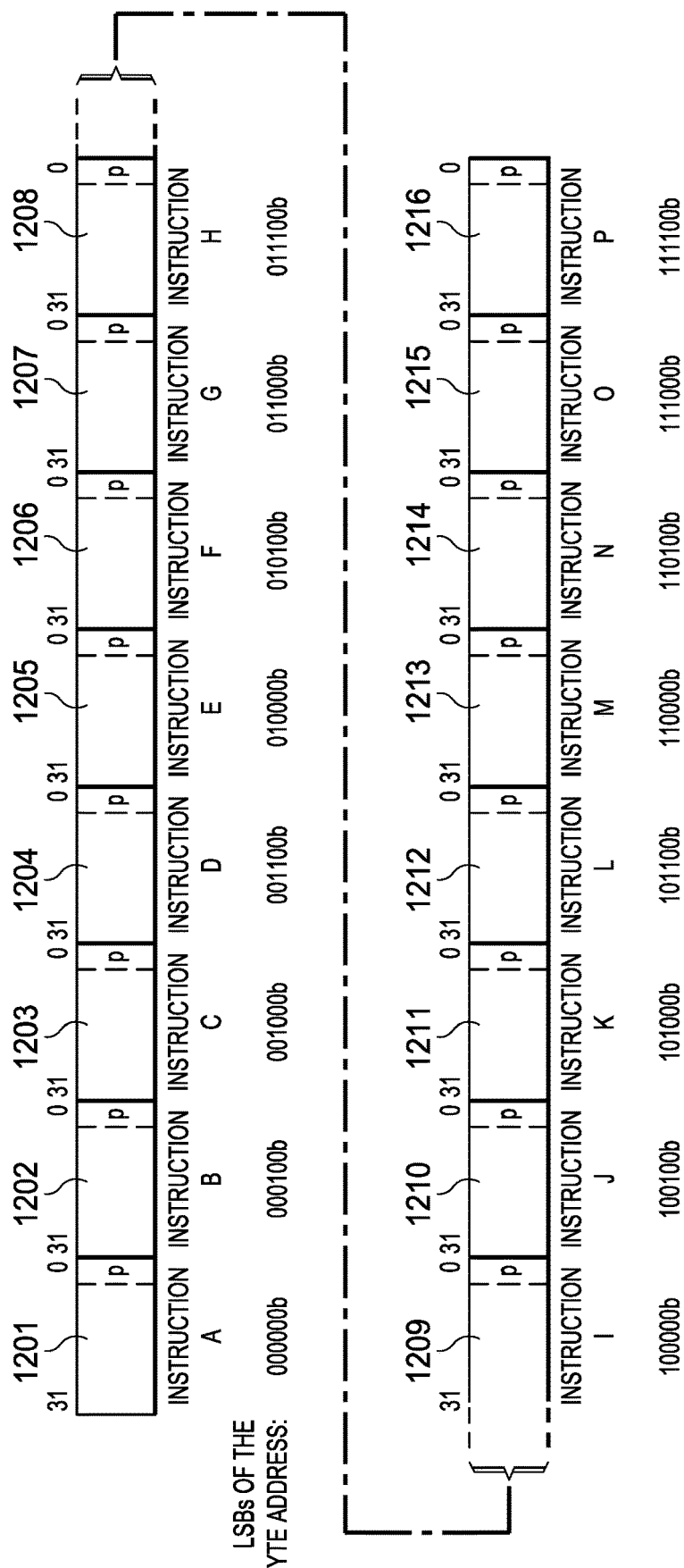
FIG. 12 illustrates sixteen instructions of a single fetch packet.

Instructions are always fetched sixteen words at a time. FIG. 12 illustrates this fetch packet. FIG. 12 illustrates 16 instructions 1201 to 1216 of a single fetch packet. Fetch packets are aligned on 512-bit (16-word) boundaries. The execution of the individual instructions is partially controlled by a p bit in each instruction. This p bit is preferably bit 0 of the instruction. The p bit determines whether the instruction executes in parallel with another instruction. The p bits are scanned from lower to higher address. If the p bit of an instruction is 1, then the next following instruction is executed in parallel with (in the same cycle as) that instruction I. If the p bit of an instruction is 0, then the next following instruction is executed in the cycle after the instruction. All instructions executing in parallel constitute an execute packet. An execute packet can contain up to nine instructions. Each instruction in an execute packet must use a different functional unit. An execute packet can contain up to nine 32-bit wide slots. A slot can either be a self-contained instruction or expand the constant field specified by the immediate preceding instruction. A slot can be used as conditional codes to apply to the instructions within the same fetch packet. A fetch packet can contain up to 2 constant extension slots and one condition code extension slot.

There are up to 11 distinct instruction slots, but scheduling restrictions limit to 9 the maximum number of parallel slots. The maximum nine slots are shared as follows: multiply unit 511; correlation unit 512; arithmetic unit 513; arithmetic unit 514; load/store unit 515; branch unit 516 shared with predicate unit 517; a first constant extension; a second constant extension; and a unit-less instruction shared with a condition code extension. The last instruction in an execute packet has a p bit equal to 0.

The CPU and level one instruction cache L1I pipelines are de-coupled from each other. Fetch packet returns from level one instruction cache L1I can take different number of clock cycles, depending on external circumstances such as whether there is a hit in level one instruction cache L1I. Therefore program access stage 1112 (PA) can take several clock cycles instead of 1 clock cycle as in the other stages.

Dispatch and decode phases 1120 include instruction dispatch to appropriate execution unit stage 1121 (DS), instruction pre-decode stage 1122 (DC1), and instruction decode, operand reads stage 1123 (DC2). During instruction dispatch to appropriate execution unit stage 1121 (DS), the fetch packets are split into execute packets and assigned to the appropriate functional units. During the instruction pre-decode stage 1122 (DC1), the source registers, destination registers, and associated paths are decoded for the execution of the instructions in the functional units. During the instruction decode, operand reads stage 1123 (DC2), more detailed unit decodes are done, as well as the reading operands from the register files.

Execution phases 1130 includes execution stages 1131 to 1135 (E1 to E5). Different types of instructions require different numbers of these stages to complete their execution. These stages of the pipeline play an important role in understanding the device state at CPU cycle boundaries.

During execute 1 stage 1131 (E1) the conditions for the instructions are evaluated and operands are operated on. As illustrated in FIG. 11, execute 1 stage 1131 may receive operands from a stream buffer 1141 and one of the register files shown schematically as 1142. For load and store instructions, address generation is performed and address modifications are written to a register file. For branch instructions, branch fetch packet in PG phase 1111 is affected. As illustrated in FIG. 11, load and store instructions access memory here shown schematically as memory 1151. For single-cycle instructions, results are written to a destination register file. This assumes that any conditions for the instructions are evaluated as true. If a condition is evaluated as false, the instruction does not write any results or have any pipeline operation after execute 1 stage 1131.

During execute 2 stage 1132 (E2) load instructions send the address to memory. Store instructions send the address and data are sent to memory. Single-cycle instructions that saturate results set the SAT bit in the control status register (CSR) if saturation occurs. For 2-cycle instructions, results are written to a destination register file.

During execute 3 stage 1133 (E3) data memory accesses are performed. Any multiply instructions that saturate results set the SAT bit in the control status register (CSR) if saturation occurs. For 3-cycle instructions, results are written to a destination register file.

During execute 4 stage 1134 (E4) load instructions bring data to the CPU boundary. For 4-cycle instructions, results are written to a destination register file.

During execute 5 stage 1135 (E5) load instructions write data into a register. This is illustrated schematically in FIG. 11 with input from memory 1151 to execute 5 stage 1135.

Figure 13:
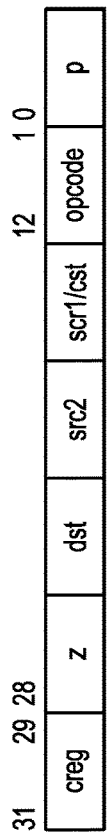
FIG. 13 illustrates an example of the instruction coding of instructions used by this invention.

FIG. 13 illustrates an example of the instruction coding of instructions used by this invention. Each instruction consists of 32 bits and controls the operation of one of the individually controllable functional units (multiply unit 511, correlation unit 512, arithmetic unit 513, arithmetic unit 514, load/store unit 515). The bit fields are defined as follows. The creg field and the z bit are optional fields used in conditional instructions. These bits are used for conditional instructions to identify the predicate register and the condition. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field and the z field are encoded in the instruction as shown in Table 2.

TABLE 2

|  | creg | | | z |
| --- | --- | --- | --- | --- |
| Conditional Register | 31 | 30 | 29 | 28 |
| Unconditional | 0 | 0 | 0 | 0 |
| Reserved | 0 | 0 | 0 | 1 |
| A0 | 0 | 0 | 1 | z |
| A1 | 0 | 1 | 0 | z |
| A2 | 0 | 1 | 1 | z |
| A3 | 1 | 0 | 0 | z |
| A4 | 1 | 0 | 1 | z |
| A5 | 1 | 1 | 0 | z |
| Reserved | 1 | 1 | x | x |

Note that "z" in the z bit column refers to the zero/not zero comparison selection noted above and "x" is a don't care state. This coding can only specify a subset of the 16 global scalar registers as predicate registers. This selection was made to preserve bits in the instruction coding. Note that unconditional instructions do not have these optional bits. For unconditional instructions these bits (28 to 31) are preferably used as additional opcode bits. However, if needed, an execute packet can contain a unique 32-bit condition code extension slot which contains the 4-bit CREGZ fields for the instructions which are in the same execute packet. Table 3 shows the coding of such a condition code extension slot.

TABLE 3

| Bits | Functional Unit |
| --- | --- |
| 3:0 | .L |
| 7:4 | .S |
| 11:5 | .D |
| 15:12 | .M |
| 19:16 | .C |
| 23:20 | .B |
| 28:24 | Reserved |
| 31:29 | Reserved |

Thus the condition code extension slot specifies bits decoded in the same way the creg/z bits assigned to a particular functional unit in the same execute packet.

The dst field specifies a register in a corresponding register file as the destination of the instruction results.

The scr2 field specifies a register in a corresponding register file as the second source operand.

The scr1/cst field has several meanings depending on the instruction opcode field (bits 1 to 12 and additionally bits 28 to 31 for unconditional instructions). The first meaning specifies a register of a corresponding register file as the first operand. The second meaning is an immediate constant. Depending on the instruction type, this is treated as an unsigned integer and zero extended to a specified data length or is treated as a signed integer and sign extended to the specified data length.

The opcode field (bits 1 to 12 for all instructions and additionally bits 28 to 31 for unconditional instructions) specifies the type of instruction and designates appropriate instruction options. This includes designation of the functional unit and operation performed. A detailed explanation of the opcode is beyond the scope of this invention except for the instruction options detailed below.

The p bit (bit 0) marks the execute packets. The p-bit determines whether the instruction executes in parallel with the following instruction. The p-bits are scanned from lower to higher addresses. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to nine instructions. Each instruction in an execute packet must use a different functional unit.

DSP calculations can involve operations where one operand is a vector, and the second operand is scalar. Some of these calculations also require the duplication of the scalar data previous to the calculation. This may be a simple duplication of the data, or it may require duplication using a specific duplication pattern.

In prior art implementations this usually required multiple instructions. The scalar data had to be loaded to the computational unit, and then the duplication was performed. This invention shows a method where the load and the duplication operations are combined into a single operation. The duplication pattern is specified by the number of duplications of each element, and the length of the element. The length may be a byte, half word, word or double word.

Figure 14:
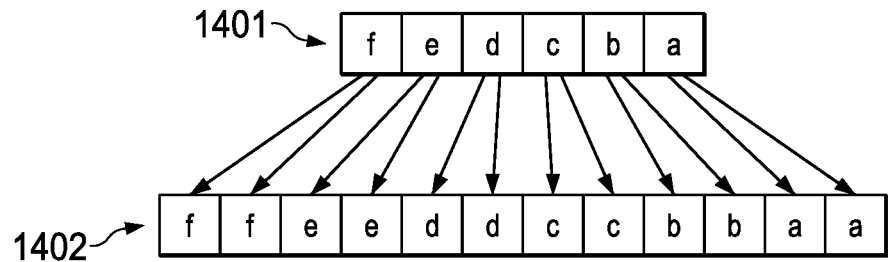
FIG. 14 illustrates scalar byte data duplication.
Figure 15:
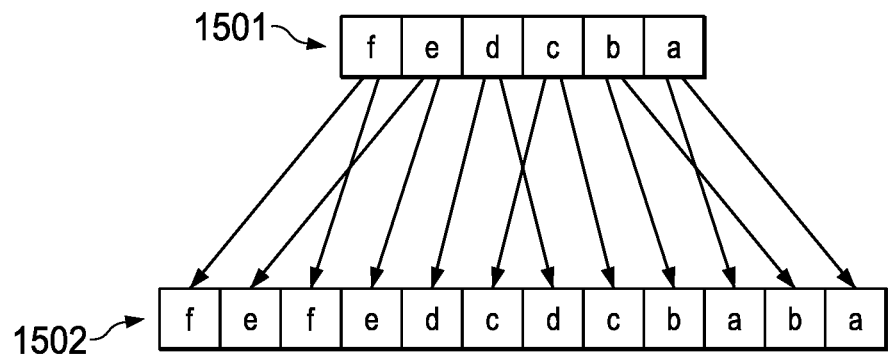
FIG. 15 illustrates scalar half word data duplication.
Figure 16:
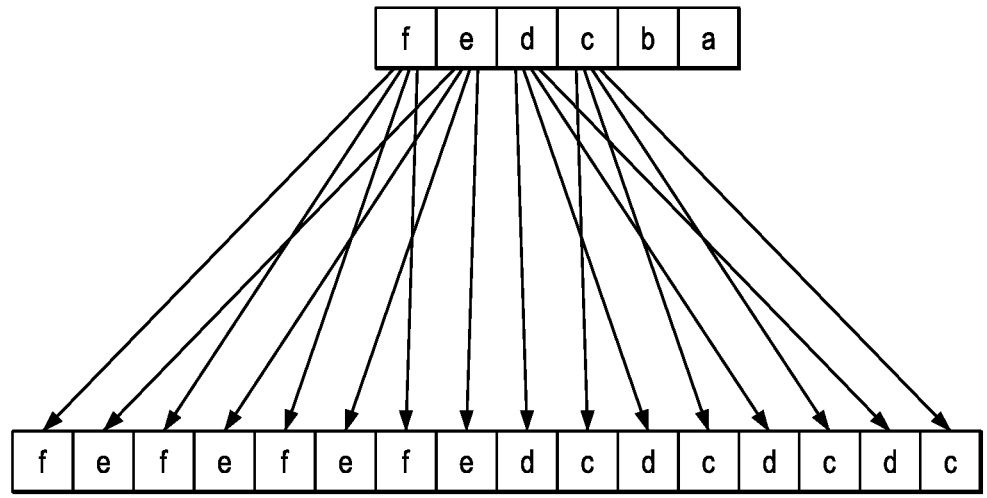
FIG. 16 illustrates scalar half word duplication with a pattern of 4.

FIG. 14 illustrates byte wide duplication. Each byte of scalar data 1401 is duplicated with the result shown in 1402. FIG. 15 illustrates duplication on half word boundaries where scalar data 1501 is duplicated two bytes at a time as shown in 1502. FIG. 16 shows duplication on half word boundaries with a duplication pattern of 4

FIG. 17 illustrates one embodiment of the invention in the Texas Instruments C7x Digital Signal Processor instruction set. 1601 shows byte duplication, 1602 shows half word duplication, 1603 shows word duplication, and 1604 shows double word duplication. The results of byte duplication with a duplication pattern of 4 are shown in 1605, and 1606 shows byte duplication with a duplication pattern of 8. Duplication patterns different from the ones shown are possible. As shown in FIG. 17, a duplication pattern may be specified as one of little endian or big endian. When little endian is selected, the duplication is in a first byte order. For instance, referring to the half word duplication example 1602, for little endian, the half word 01 is duplicated as 0101. When big endian is selected for the same example, the duplication is in a second byte order that is opposite the first byte order, i.e., the half word 01 is duplicated as 1010.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results unless such order is recited in one or more claims. In certain circumstances, multitasking and parallel processing may be advantageous. Moreover, the separation of various system components in the embodiments described above should not be understood as requiring such separation in all embodiments.

What is claimed is:

1. A method comprising:
receiving, in a processor, an instruction including a first information specifying a source storage, a second information specifying a destination storage, and a third information specifying a duplication number, wherein the duplication number is an immediate constant in the instruction; and
executing the instruction using the processor to cause each of a plurality of data elements stored in the source storage to be loaded into the destination storage n times;
wherein the duplication number is a single value equal to n, and n is an integer greater than 1;
wherein each of the plurality of data elements is loaded into the destination storage based on the single value; and
wherein each data element is loaded into a respective n consecutive locations in the destination storage.

2. The method of claim 1, wherein, for each data element, each of the respective n consecutive locations to which the data element is loaded in the destination storage has a size equal to a data element size of the data element.

3. The method of claim 2, wherein the data element size is equal to a byte.

4. The method of claim 1, wherein:
the source storage is a first register; and
the destination storage is a second register.

5. The method of claim 4, wherein:
the processor is a vector processor that includes a scalar register file and a vector register file;
the first register is a register in the scalar register file; and
the second register is a register in the vector register file and has a greater number of bits than the first register.

6. The method of claim 5, wherein the second register has four times as many bits as the first register.

7. The method of claim 5, wherein the first register is a 64-bit register and the second register is a 256-bit register.

8. A processor comprising:
a source register; and
a destination register; wherein:
the processor is configured to execute an instruction having a first field containing first information specifying the source register, a second field containing second information specifying the destination register, and a third field including a duplication number, the duplication number being an integer>1;
the execution of the instruction causing each of a plurality of data elements stored in the source register to be loaded into the destination register n times;
n is equal to the duplication number, and wherein each of the plurality of data elements is loaded into a respective n consecutive locations in the destination register;
the instruction specifies a pattern selected from one of a big endian pattern and a small endian pattern; and
the execution of the instruction causes each of the plurality of data elements stored in the source register to be loaded into the destination register based on the pattern.

9. The processor of claim 8, wherein:
the source register is a scalar register in a scalar register file; and
the destination register is a vector register in a vector register file.

10. The processor of claim 8, wherein, for each data element of the plurality of data elements, each of the respective n consecutive locations to which the data element is loaded in the destination register has a size equal to a data element size of the data element.

11. The processor of claim 10, wherein the data element size is equal to a byte.

12. A method comprising:
receiving, in a processor, a duplication instruction including a first information specifying a source register, a second information specifying a destination register, and a third information specifying a duplication number; and
executing the duplication instruction using the processor to cause first and second data elements of a plurality of data elements stored in the source register to be loaded into a first set of consecutive locations in the destination register in an interleaving manner a number of times equal to the duplication number;
wherein the duplication number is a single value within the duplication instruction;
wherein the first and second data elements are loaded into the destination register based on the single value; and
wherein the first and second data elements are stored in consecutive locations in the destination register.

13. The method of claim 12, wherein the first set of consecutive locations in the destination register includes consecutive first, second, third, and fourth locations, and wherein the first data element is loaded into the first and third locations and the second data element is loaded into the second and fourth locations.

14. The method of claim 13, wherein the first, second, third, and fourth locations collectively represent a set of least significant bits in the destination register.

15. The method of claim 14, wherein executing the duplication instruction using the processor causes third and fourth data elements of the plurality of data elements stored in the source register to be loaded into a second set of consecutive locations in the destination register in the interleaving manner the number of times equal to the duplication number, wherein the third and fourth data elements are stored in consecutive locations in the source register.

16. The method of claim 15, wherein the second set of consecutive locations in the destination register includes consecutive fifth, sixth, seventh, and eighth locations, and wherein the third data element is loaded into the fifth and seventh locations and the fourth data element is loaded into the sixth and eighth locations.

17. The method of claim 16, wherein the fifth, sixth, seventh, and eighth locations collectively represent a next set of least significant bits in the destination register after the first, second, third, and fourth locations.

18. The method of claim 12, wherein each location in the destination register has a size equal to one byte.

* * * * *